United States Patent [19]

Curotto

[11] 4,270,790
[45] Jun. 2, 1981

[54] CONVERTIBLE SEAT AND STORAGE DEVICE FOR AUTOMOBILES

[75] Inventor: Richard L. Curotto, Sayerville, N.J.

[73] Assignee: Stutz Motor Car of America, Inc., New York, N.Y.

[21] Appl. No.: 73,280

[22] Filed: Sep. 7, 1979

[51] Int. Cl.³ .............................................. B60N 3/12
[52] U.S. Cl. ................................................ 296/37.16
[58] Field of Search .................. 296/37.1, 37.8, 37.16; 297/119, 191, 163

[56] References Cited

U.S. PATENT DOCUMENTS

| 1,806,882 | 5/1931 | Richardson | 296/37.16 |
| 2,653,741 | 9/1953 | Senk | 296/37.16 |
| 3,993,345 | 11/1976 | Croup | 296/37.16 |

Primary Examiner—Randolph A. Reese
Assistant Examiner—John A. Carroll
Attorney, Agent, or Firm—Hopgood, Calimafde, Kalil, Blaustein & Judlowe

[57] ABSTRACT

The invention contemplates an automobile seat and storage construction wherein the seat back is forwardly tilted to a down position to expose access to a rear storage space. A horizontally guided tray, which may be specifically adapted to accommodate one or more removable "hard-top" panels has an actuating connection to the rear of the tiltable seat back, whereby in folding the seat back to its down position, the tray and its load are guided forwardly to provide easy access to the tray load without disturbing baggage or other loading within the storage compartment of the vehicle. Upon raising the seat back to its normal upright position, the tray and its load are stowed out of sight within the storage compartment.

10 Claims, 6 Drawing Figures

CONVERTIBLE SEAT AND STORAGE DEVICE FOR AUTOMOBILES

BACKGROUND OF THE INVENTION

The invention relates to a vehicle-body construction of the type wherein a folding seat-back element affords access to storage space rearward of the seat.

As far as I am aware, it is a frequent practice in small-vehicle body design to provide a hinged seat back as the means of access to rear storage space, but to gain access to such space requires a most awkward and inconvenient posture and reach over the folded seat back. Of course, the awkwardness is avoided if the vehicle body includes an exterior hinged lid for outside access, but in larger vehicles it is still awkward to reach distant inner recesses even via an opened exterior lid.

Moreover, so-called "hard-top" convertibles are sometimes equipped with one or more removable top panels which are awkward if not impossible to stow in the vehicle's storage space without imposing major restrictions and burdens on the handling of baggage and/or other articles to be accommodated in the storage space.

BRIEF STATEMENT OF THE INVENTION

It is, accordingly, an object of the invention to provide an improved body construction of the character indicated, affording convenience hitherto unknown and avoiding the awkwardness encountered in use of prior constructions.

A specific object is to provide a simple and easily operated means for stowing one or more removed panels of a hard-top convertible vehicle.

Another specific object is to achieve the above objects via a direct access which cannot disturb or require relocation of baggage or other articles stowed in the storage space.

A further specific object is to provide a directly accessible article-storage device in a car-body construction wherein the device will accommodate its load without change of load orientation and without disturbing or requiring relocation of other articles stowed in the storage space.

The invention achieves the foregoing and other objects and features by providing an auxiliary storage device in the form of a tray or sliding rack which is guided for generally horizontal displacement, in coupled coordination with actuation of an adjacent foldable seat back. Folding the seat back to down or lowered position draws the tray and its contents forward, for easy and convenient access, and raising the seat back to its normally erect position returns the tray and its contents to the storage compartment of the vehicle. Thus, although the tray (with its contents) does constitute some restriction on otherwise unimpeded use of the storage-compartment volume, there is no interference with baggage or other articles stowed in the remaining volume, neither is there any limitation on the direct accessibility of the baggage or other such articles via the customary exterior hinged lid of the body.

DESCRIPTION OF A PREFERRED EMBODIMENT

The invention will be described for a preferred embodiment, in conjunction with the accompanying drawings, in which.

Figure 4:
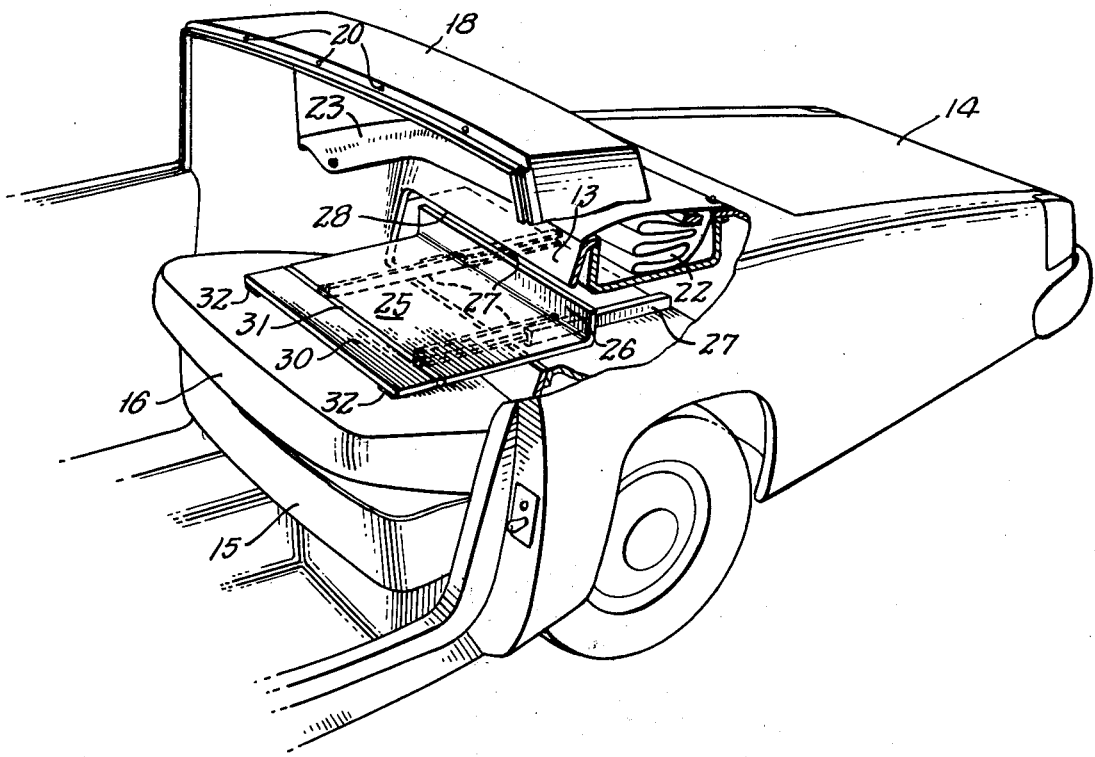
FIG. 4 is an enlarged fragmentary view in perspective to show interior detail, for the situation in which the invention is conditioned for access to the auxiliary storage means incorporated in the body of FIG. 1.

In the vehicle chosen to illustrate use of the invention, the body style is a two-door convertible wherein a single door 10 forwardly hinged from each sidewall of the body affords selective seating access to front-seat means 11 and to rear-seat means 12. A dividing wall 13 separates the passenger compartment from a rear storage compartment, to which normal baggage-handling access may be had through a conventional hinged lid 14, as by raising the same on forwardly located hinges, not shown. For simplicity of illustration, the front and rear seat means may each be of the so-called bench variety, extending wall-to-wall across the passenger compartment, and with a similarly extensive hinged seat-back element, the bench seat 15 and associated hinged seat-back element 16 (FIG. 4) being of such nature; but it will be understood that independently hinged, divided seat-back elements and/or bucket seats with hinged backs may alternatively be employed.

Figure 1:
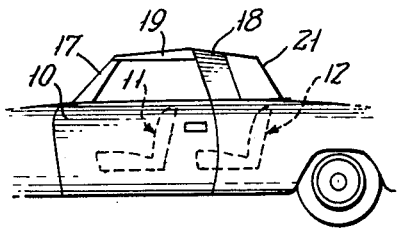
FIG. 1 is a simplified view in side elevation of a convertible automobile-body construction embodying auxiliary storage means of the invention.
Figure 2:
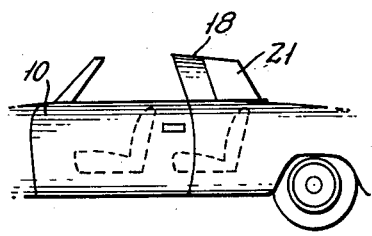
FIGS. 2 and 3 are fragmentary views similar to FIG. 1, to show different selectively available body configurations with the construction of FIG. 1.
Figure 3:
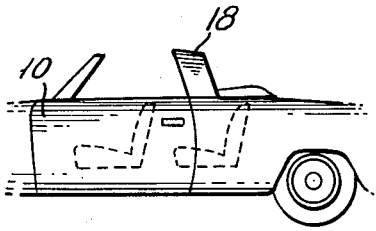

In the illustrative configuration, upper fixed body structure comprises front corner posts 17 transversely connected to complete a windshield frame, and a rigid inverted-U member 18 which is located adjacent the rear-edge location of doors 10 serves both as a "roll bar" and as permanent body exterior, being part of each of the body sides and part of the top structure. Between the top of the windshield frame and the member 18, two rigid top panels 19-19' are removably received and may be locked in place, as to each other along a central alignment, and to the windshield frame and the forward edge of member 18, suitable locating fittings 20 being shown for the purpose in spaced relation on member 18. In the passenger-compartment space rearward of "roll-bar" member 18, foldable convertible-top frame members (not shown) carry suitable "soft" top fabric 21 to selectively position the same in its up position (FIGS. 1 and 2) or in its down position (FIG. 3). In the down position, the top fabric 21, an associated rear window (not shown) and fabric-supporting members (which may be electrically operated by conventional means) will be understood to have become suitably folded and accommodated within an upwardly open well 22 immediately to the rear of dividing panel 13, and a flexible boot 23 covers the stowed flexible top structure when in down position, in well 22. In its raised position, the top fabric 21 and its foldable support structure will have been removably fitted to the rear edge of member 18, as will be understood.

Figure 5:
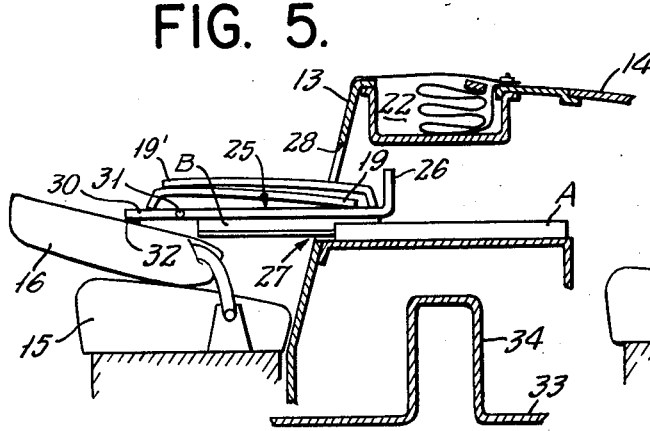
FIGS. 5 and 6 are similar simplified and somewhat schematic views in side elevation to illustrate the respective "accessible" and "stowed" conditions of the invention.
Figure 6:
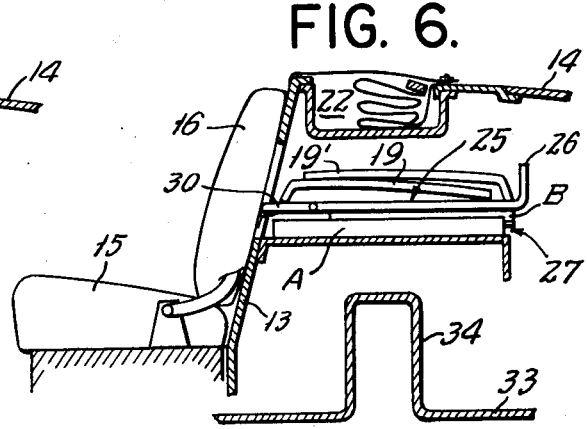

In accordance with the invention, bulky articles such as the two removable top panels 19-19' may be stowed within the storage compartment to the rear of seat means 12, with extreme ease and convenience of access and without disturbing baggage or the like which may already have been stowed in the same compartment via the rear lid 14. To this end, a tray member 25, which may be a rectangular platform with an upstanding integral rear wall 26 is longitudinally displaceable on spaced parallel guide means 27; in each case, means 27 may comprise a rail member A fixed to the car body and coacting (preferably via interposed rolling elements, not shown) with a longitudinally lapping rail member B fixed to the underside of tray member 25. The extent of tray-member displaceability is shown in FIGS. 5 and 6 which respectively illustrate the "access" and "stowed" positions thereof. To accommodate such displacement of tray member 25 and its load (19-19'), the dividing panel 13 has a suitable rectangular opening, the upper limit 28 of which is at slightly greater elevation than the upper limit of rear wall 26, which in turn is preferably sufficiently high to assure against insertion of one or both panels 19-19' beyond the rear end of tray member 25.

In the form shown, a link 30 which may be an elongage rectangular panel, has a first hinge-axis connection 31 to the forward edge of tray member 25 and second hinge-axis connections 32 to the back of seat element 16 and along the forward edge of link 30. In the "access" position shown in FIGS. 4 and 5, link 30 is horizontal and a flat extension of tray member 25; and in the "stowed" position of FIG. 6, link 30 is also flat with tray member 25. It is only in the course of actuating seat element 16 between its FIG. 5 and FIG. 6 positions that link 30 transiently raises and lowers, to assure consistent horizontal orientation of tray member 25 throughout its displacement.

It will be seen that the described invention meets all stated objects and affords extremely easy access and utmost convenience, for converting the automobile-body condition; in fact, if the "soft" top 21 is first lowered, and seat element 16 folded down, the access to tray member 25 is direct from outside and above, via the "soft"-top opening. The tray-storage requirements within the rear storage compartment are minimal and are located well above the floor 33 of the rear compartment, in fact, the tray-storage requirements may be virtually entirely accommodated in the space above the "hump" 34 which is customary to permit rear-axle displacement. And for the described case of two panels 19-19' to complete the hard-top enclosure, the lateral extent of tray member 25 makes generous provision when in the range which is between one-half and the full extent of inside width of the body. Moreover, the tray member 25 serves admirably to provide ready accommodation and access to more frequently needed luggage, at such times as panels 19-19' are not to be stored thereon.

While the invention has been shown and described for the preferred form, it will be understood that modifications may be made without departing from the scope of the invention. For example, if strictly horizontal displacement is not deemed necessary for tray member 25, it may be directly connected to hinge means 32 on seat-back element 16, and skid or roller means at the rear end of tray member 25 may ride fixed rail members at the described locations A. Also, in smaller sports cars, the described seat elements 15-16 will be understood to be the front seats, i.e., only seats, and if the seat back is divided, only one of the hinged backs need be connected to tray member 25 to achieve the described seat-and-tray coordination.

What is claimed is:

1. In a vehicle body construction wherein a seat-back element has a hinged mounting enabling said seat-back element to be selectively moved between an upward generally vertical position at the rear of a generally horizontal seat element and a downwardly folded generally horizontal lower position in at least partial overlap with said seat element and wherein storage space exists within the body to the rear of said seat and seat-back elements, the improvement wherein body-mounted generally horizontal guide means extends rearward within said storage space and in proximity to said seat and seat-back elements, wherein a tray member has generally longitudinally movable support via said guide means, and wherein a connection from said tray member to said seat-back element above and offset from the hinge axis determines forward tray-member displacement upon downward folding displacement of said seat-back element and rearward tray-member displacement upon upward positioning displacement of said seat-back element.

2. The improvement of claim 1, in which the body construction includes a removable top panel, said tray member being sized to support said top panel when removed for storage behind said seat and seat-back elements.

3. The improvement of claim 1, in which the body construction includes two removable top panels, said tray member being sized to suppot both said top panels in vertically stacked array.

4. The improvement of claim 1, in which the body construction includes convertible-top elements an associated flexible cover material, and an upwardly open well structure adjacent and behind said seat-back element and receiving said convertible-top elements and material when in downwardly folded position, said well structure being in vertically offset relation to the path of movement of said tray member.

5. The improvement of claim 1, wherein said guide means determines rectilinear displaceability of said tray member, and wherein said connection includes a link having pivoted connection to said tray member and pivoted connection to said seat-back member.

6. The improvement of claim 5, wherein said link member is rectangular and the pivot axis of its connection to said tray member is along one of the long sides of the rectangle, the pivot axis of link-member connection to said seat-back element being along the other long side of the rectangle.

7. The improvement of claim 1, wherein said tray member is generally flat and includes an upstanding rear retaining wall to limit insertion of one or more tray-loading articles.

8. The improvement of claim 7, wherein the body construction includes a fixed upstanding wall dividing the storage space from the seat and seat-back elements, said wall having a slotted opening sized for clearance with the path of movement of said track member.

9. The improvement of claim 8, in which the upper edge of the slotted opening is slightly above the upper limit of said retaining wall.

10. The improvement of claim 1, in which said seat element is a bench seat extending from side to side of the body construction, said tray member being of width less than that of said bench seat and more than half that of said bench seat.

* * * * *

UNITED STATES PATENT AND TRADEMARK OFFICE
CERTIFICATE OF CORRECTION

PATENT NO. : 4,270,790
DATED : June 2, 1981
INVENTOR(S) : Richard L. Curotto

It is certified that error appears in the above-identified patent and that said Letters Patent are hereby corrected as shown below:

IN THE CLAIMS:

Claim 3, Column 4, line 28 -

"suppot" should be --support--;

Claim 8, Column 4, line 57 -

"track" should be --tray--

Signed and Sealed this

Eighth Day of September 1981

[SEAL]

Attest:

Attesting Officer

GERALD J. MOSSINGHOFF

Commissioner of Patents and Trademarks